(12) United States Patent
Noda (10) Patent No.: US 6,338,155 B1
(45) Date of Patent: Jan. 8, 2002

(54) DATA GENERATION METHOD AND APPARATUS (75) Inventor: Chosaku Noda, Kawasaki (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/285,457

(22) Filed: Apr. 2, 1999

(30) Foreign Application Priority Data

Apr. 3, 1998 (JP) .......................................... 10-091067

(51) Int. Cl.[7] .............................................. G11C 29/00
(52) U.S. Cl. ..................................................... 714/763
(58) Field of Search ................................ 714/755, 769, 714/761, 763; 369/44–31; 386/84, 95; 360/53, 48

(56) References Cited

U.S. PATENT DOCUMENTS 5,696,774 A * 12/1997 Inoue et al. ................. 714/755
5,745,505 A * 4/1998 Yonemitsu et al. .......... 714/755
5,768,298 A * 6/1998 Nagai et al. ................. 714/769
5,856,890 A * 1/1999 Hamai et al. ................. 360/53

* cited by examiner

Primary Examiner—Albert Decady
Assistant Examiner—Shelly A Chase
(74) Attorney, Agent, or Firm—Pillsbury Winthrop LLP (57) ABSTRACT A data generator generating a data stream having a first data generation unit and a second data generation unit. The first data generation unit recording data on a recording medium with a first recording density. The first and second units encoding input digital data in accordance with a first error correction coding to generate a first check parity, making a unit block having a data area and the first check parity provided at an end of data area, and dividing the unit block. The first unit providing a sync pattern at a head of each of the first divided areas to obtain a first data stream. The second data generation unit recording data on a recording medium with a second recording density. The second unit providing a sync pattern at a head of the unit block to obtain a second data stream.

12 Claims, 5 Drawing Sheets

| SYNC1 | DATA | SYNC2 | DATA | INNER PARITY |
|---|---|---|---|---|
| xx xx | 0 1 2 ... 89 90 | xx xx | 91 92 93 ... 170 171 172 173 174 | ... 179 180 181 |

ADDITIONAL PARITY ↓

FIG. 7B

| SYNC1 | DATA | | DATA | INNER PARITY |
|---|---|---|---|---|
| xx xx | 0 1 2 ... 89 90 | 182 183 | 91 92 93 ... 170 171 172 173 174 | ... 179 180 181 |

ERROR DATA IS WRITTEN

FIG. 7C

| SYNC1 | DATA | SYNC2 | DATA | INNER PARITY |
|---|---|---|---|---|
| xx xx | 0 1 2 ... 89 90 | xx xx 182 183 | 91 92 93 ... 170 171 172 173 174 | ... 179 180 181 |

ADDITIONAL PARITY ↓

FIG. 7D

| SYNC1 | DATA | | DATA | INNER PARITY |
|---|---|---|---|---|
| xx xx | 0 1 2 ... 89 90 | xx xx | 91 92 93 ... 170 171 172 173 174 | ... 179 180 181 |

ADDITIONAL PARITY IS LOST ceps can be corrected.

DATA GENERATION METHOD AND APPARATUS

BACKGROUND OF THE INVENTION

The present invention relates to a data generating method and a data generating apparatus which can enhance an error correction capability without degrading a formatting efficiency when high-density recording is performed in a digital record/playback apparatus using an optical disk, etc.

In a digital record/playback apparatus for recording/playing back digital data on/from an optical disk, a magnetic disk, magnetic tape, etc., a recording capacity per unit area has been increased with the development of high-density recording technology. On the other hand, in the digital record/playback apparatus, in order to cope with the problem of data errors due to noise or flaws on the medium, error correction coding is performed on the record data so that errors can be corrected.

If the recording density increases, the error rate also increases due to a decrease in signal components. Moreover, even if a flaw equal in size to one on an ordinary medium occurs on the high-density recording medium, more errors will occur than on the ordinary medium. Thus, the high-density recording medium requires error correction codes with a higher error correction capability. In particular, as the signal output decreases, it becomes more important to cope with the problem of random errors.

An example of the error correction code generally used in modern digital record/playback apparatuses is a product code formed by combining two kinds of Reed-Solomon codes. The product code comprises inner codes, which are successive or concentrated in a narrow range in a recorded data stream, and outer codes arranged in an interlaced fashion in the recorded data stream. An example of the product code is shown in FIG. 8.

Record data is arranged in a two-dimensional block. In FIG. 8, outer codes are encoded vertically for each column. An outer code parity generated by the coding is located at a lower end of each column. Then, inner codes are encoded horizontally for each row of the data and outer code parity. The inner code parity generated by the encoding is situated at a right end of each row. The product code block thus encoded by the outer codes and inner codes is taken out and successively recorded on a recording medium along with sync patterns for identifying delimiters of data.

Figure 8:
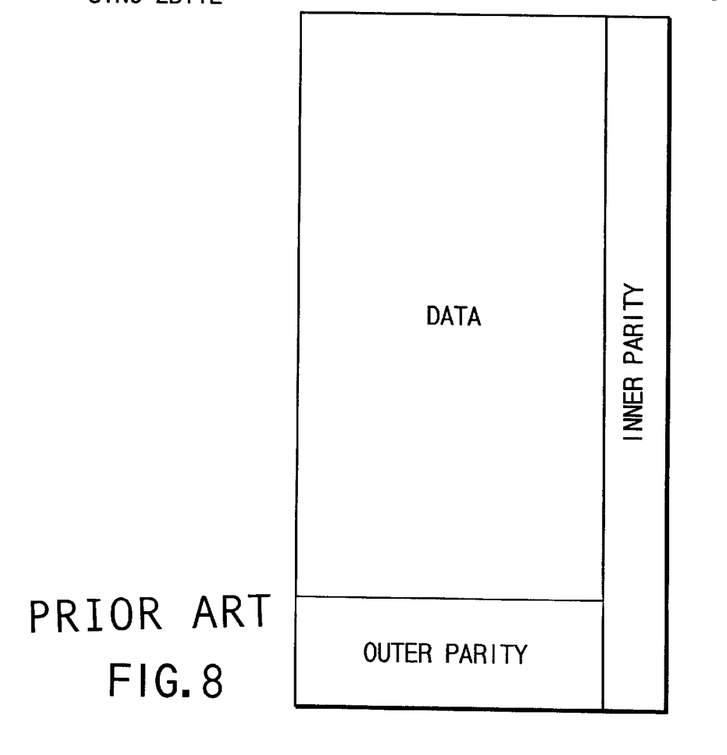
FIG. 8 shows an example of a conventional product code.

When the data thus recorded is played back, the product code block shown in FIG. 8 is reconstructed from the read-out data, and inner code correction is performed by using the inner code parity for each row. Then, outer code correction is performed by using the outer code parity for each column.

The inner code correction is effective mainly for correction of random errors. If a burst error occurs due to a flaw on the recording medium, errors concentrate at one inner code. Thus, the burst error cannot effectively be corrected in the inner code.

The outer code correction is effective mainly for correction of burst errors. Since most of random errors are eliminated by the inner code correction, it is considered that most of errors corrected by the outer code correction are burst errors. The outer codes are arranged in the column direction in the product code block, and thus even if successive burst errors have occurred, it is less possible that many data units are made erroneous at a time. Accordingly, the burst errors, which have not been corrected by the inner code correction, can be corrected by the outer code correction.

The recording density of the medium increases gradually as the capacity of the storage device increases. If the recording density increases, the area of the medium which can be used for storing unit data decreases and the output level of the read-out signal decreases. The decrease in the read-out signal level increases the number of random errors. In order to compensate the decrease in the signal output level, the performance of the medium has been improved. Nevertheless, the random error rate has increased.

Accordingly, when the high-density recording is performed, it is necessary to use error correction codes having a higher random error correction capability. In the product codes, the random error correction capability depends greatly on the contribution of the inner code correction capability. It thus appears that the enhancement of the inner code correction capability is effective to increase the random error correction capability.

A method of increasing the parity data to be added by means of coding is adopted to increase the correction performance of Reed-Solomon codes. However, if the inner code parity is simply increased, the effective data ratio (formatting efficiency) per unit record data will decrease. Even if the error correction capability is increased by the addition of the inner code parity and the increased capability is used to enhance the recording density, the record data amount decreases due to the decrease in formatting efficiency.

As has been described above, even if the random error correction capability is increased by increasing the inner code parity data in the conventional method, the formatting efficiency decreases and the effect of improving the memory capacity in the apparatus decreases.

BRIEF SUMMARY OF THE INVENTION

The present invention aims at providing a data generation method and a data generation apparatus capable of enhancing recording density by increasing an inner code party number without lowering formatting efficiency.

According to the invention there is provided a data generation method for generating a data stream comprising the steps of: a first data generation process for recording data on a recording medium with a first recording density including, encoding input digital data in accordance with a first error correction coding to generate a first check parity, making a first unit block having a data area having a predetermined data length and the first check parity provided at an end of the data area, dividing first the unit block into a plurality of divided areas, and providing a sync pattern at a head of each of the first divided areas to obtain a first data stream, and a second data generation process for recording data on a recording medium with a second recording density higher than the first recording density including, encoding input digital data in accordance with a second error correction coding to generate a second check parity greater in number than the first check parity, making a second unit block having a data area having a predetermined data length and the second check parity provided at an end of the data area, and providing a sync pattern at a head of the second unit block to obtain a second data stream, and wherein at least one of the first data generation process and the second data generation process is used to generate the data stream.

According to the invention there is provided a data generation method for generating a data stream comprising the steps of: a first data generation process for recording data on a recording medium with a first recording density including, encoding input digital data in accordance with a first error correction coding to generate a first check parity, making a first unit block having a data area having a predetermined data length and the first check parity provided at an end of the data area, dividing the first unit block into a plurality of divided areas, and providing a sync pattern at a head of each of the first divided areas, to obtain a first data stream, and a second data generation process for recording data on a recording medium with a second recording density higher than the first recording density, encoding input digital data in accordance with a second error correction coding to generate a second check parity greater in number than the first check parity, making a second unit block having a data area having a predetermined data length and a part of the second check parity provided at an end of the data area, dividing the second unit block into a plurality of second divided areas, and providing a sync pattern at a head of a top one of the second divided areas, and providing a remaining part of the second check parity at a head of another one of the second divided areas which follows the top one, to obtain a second data stream, and wherein at least one of the first data generation process and the second data generation process is used to generate the data stream.

According to the invention there is provided a data generation apparatus for generating a data stream comprising: a first data generation unit which records data on a recording medium with a first recording density including, a first encoder which encodes input digital data in accordance with a first error correction coding to generate a first check parity, a first unit block making section which makes a first unit block having a data area having a predetermined data length and the first check parity provided at an end of the data area, a first dividing section which divides the first unit block into a plurality of divided areas, and a first providing section which provides a sync pattern at a head of each of the first divided areas to obtain a first data stream, and a second data generation unit which records data on a recording medium with a second recording density higher than the first recording density including, a second encoder which encodes input digital data in accordance with a second error correction coding to generate a second check parity greater in number than the first check parity, a second unit block making section which makes a second unit block having a data area having a predetermined data length and the second check parity provided at an end of the data area, and a second providing section which provides a sync pattern at a head of the second unit block to obtain a second data stream, and wherein at least one of the first data generation unit and the second data generation unit is used to generate the data stream.

According to the invention there is provided a data generation apparatus for generating a data stream comprising: a first data generation unit which records data on a recording medium with a first recording density including, a first encoder which encodes input digital data in accordance with a first error correction coding to generate a first check parity, a first unit block making section which makes a first unit block having a data area having a predetermined data length and the first check parity provided at an end of the data area, a first dividing section which divides the first unit block into a plurality of divided areas, and a first providing section which provides a sync pattern at a head of each of the first divided areas, to obtain a first data stream, and a second data generation unit which records data on a recording medium with a second recording density higher than the first recording density, a second encoder which encodes input digital data in accordance with a second error correction coding to generate a second check parity greater in number than the first check parity, a second unit block making section which makes a second unit block having a data area having a predetermined data length and a part of the second check parity provided at an end of the data area, a second dividing section which divides the second unit block into a plurality of second divided areas, and a second providing section which provides a sync pattern at a head of a top one of the second divided areas, and a third providing section which provides a remaining part of the second check parity at a head of another one of the second divided areas which follows the top one, to obtain a second data stream, and wherein at least one of the first data generation unit and the second data generation unit is used to generate the data stream.

According to the present invention, when recording density is high, the size of a block to which a sync pattern is added is made greater than in the case of low recording density. Thus, the number of sync patterns per unit data is reduced and additional check parity is assigned to a region corresponding to the omitted sync pattern. Thereby, the error correction capability at the time of high density recording can be enhanced without lowering the formatting efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described in detail with reference to the accompanying drawings. At first, an embodiment of the invention wherein the invention is applied to a digital optical disk apparatus will be described with reference to the drawings. Digitized image signals and speech signals and various digital data processed in computers can be recorded on a digital optical disk.

Figure 1:
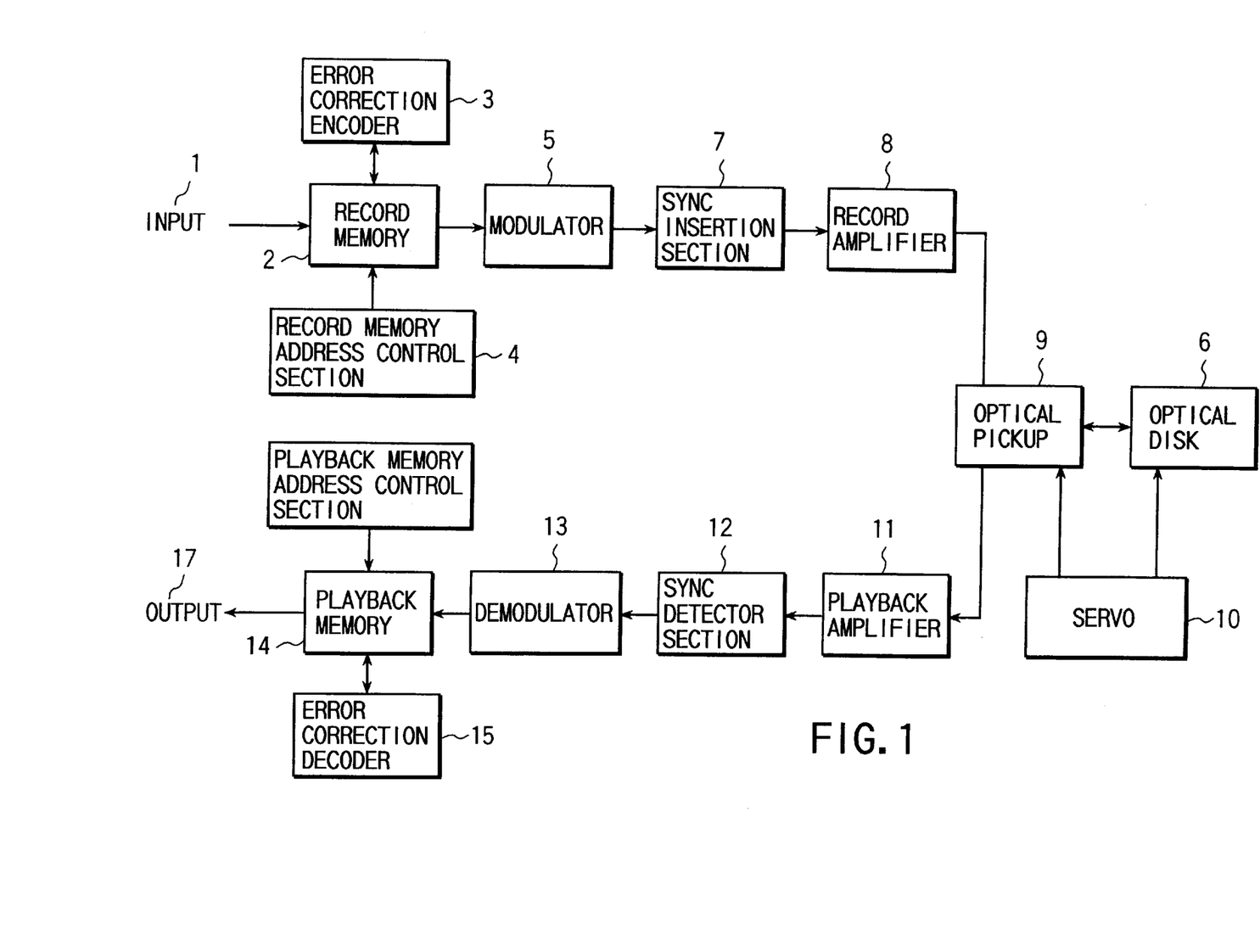
FIG. 1 is a block diagram showing the structure of a digital optical disk apparatus.

FIG. 1 is a block diagram showing the structure of a digital optical disk apparatus. Data to be recorded is input as digital data from an input terminal 1. The input data is treated in units of a sector having a predetermined size. The input data is once rewritten in a record memory 2 in units of a sector along with auxiliary information, etc. to be added.

The data in the record memory 2 is read out and subjected to a coding process for an error correction code in an error correction encoder 3. Parity data generated by the coding process is additionally written in the record memory 2. Since the encoding is performed according to a predetermined error correction format, an access to the record memory 2 is performed according to address signals supplied from a record memory address control section 4.

The data subjected to the error correction coding is read out from the record memory 2. The data read-out from the memory is performed in an order different from the order of write according to the predetermined format. The readout data is converted to a signal format corresponding to the record characteristics of an optical disk 6. A sync signal is inserted in the modulated signal in a sync insertion section 7 to set a reference position for playback. Then, the modulated signal is input to an optical pickup unit 9 via a record amplifier 8. The data is recorded on the optical disk 6 by a laser signal output from the optical pickup unit 9.

Record tracks are formed on the optical disk 6 concentrically or spirally. The data record position on the optical disk is determined by controlling the rotation of the optical disk 6 and the position of the optical pickup unit 9 by means of a servo unit 10.

The data recorded on the optical disk 6 is played back in the following manner. The optical disk to be played back is not limited to the recordable/reproducible optical disk, and it may be a playback-only disk on which data was recorded at the time of manufacture of the disk, or a disk having both a recordable area and a playback-only area.

The optical disk 6 is rotated and the optical pickup unit 9 is controlled by the servo unit 10. Thus the signal recorded on the optical disk 6 is read out with use of a laser beam. The signal read out by the optical pickup unit 9 is input to a sync detector 12 via a playback amplifier 11. A sync detector 12 finds a reference position for a demodulation process from the sync pattern in the played-back signal. A demodulator 13 restores the played-back signal to its pre-modulation data format and temporarily writes the demodulated signal in a playback memory 14. The write to the playback memory 14 is performed according to a predetermined format in an order corresponding to an inverse transformation to the transformation in the recording mode.

The playback data contains errors occurring due to noise or flaws on the medium. An error correction decoder 15 reads out the data from the playback memory 14 and detects and corrects errors in the playback data by using the parity data added by the error correction coding process. Corrected data obtained by the error correction process for the data requiring error correction is overwritten in the playback memory 14. In this case, the access to the playback memory 14 is performed in accordance with an address signal output from a playback memory address controller 16 on the basis of a predetermined error correction format.

The corrected data is read out from the playback memory 14 and output from an output terminal 17 in units of a sector.

Figure 2:
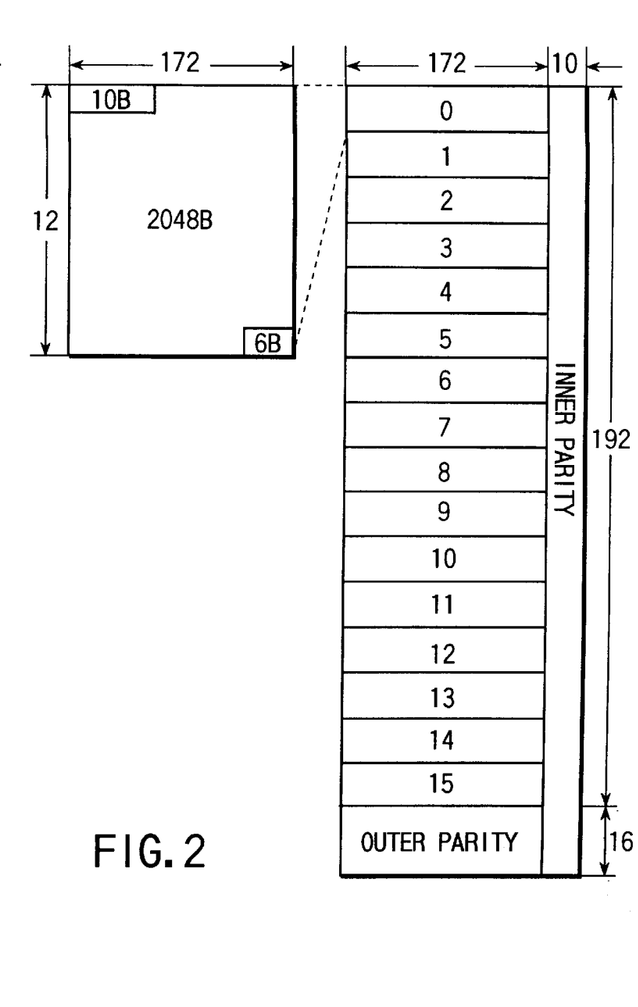
FIG. 2 shows an error correction code.

FIG. 2 shows an example of an error correction code encoded by the error correction encoder 3.

Input data is treated in units of a sector of 2048 bytes. Each sector is combined with additional information of 16 bytes into a block of 2064 bytes. Further, the 2064-byte data for error correction coding is arranged in a format of 172 columns×12 rows. Sixteen blocks of this data are vertically arranged to constitute a data block of 172 columns×192 rows.

Encoding of Reed-Solomon product codes is performed for the data block thus constituted, and parity data is generated. At first, outer codes are encoded vertically for the data block in the column direction. Encoding of RS (208, 192, 17) codes is performed for 192-byte data for each column, and 16-byte parity data is generated as outer code parity. After outer codes are encoded for all columns, inner codes are encoded for the data block and outer code parity in the row direction. Encoding of RS (182, 172, 11) codes is performed for 172-byte data for each row, and 10-byte parity data is generated as inner code parity. If inner codes are encoded for all rows, an error correction block of 182 columns×208 rows is finally generated.

Figure 3:
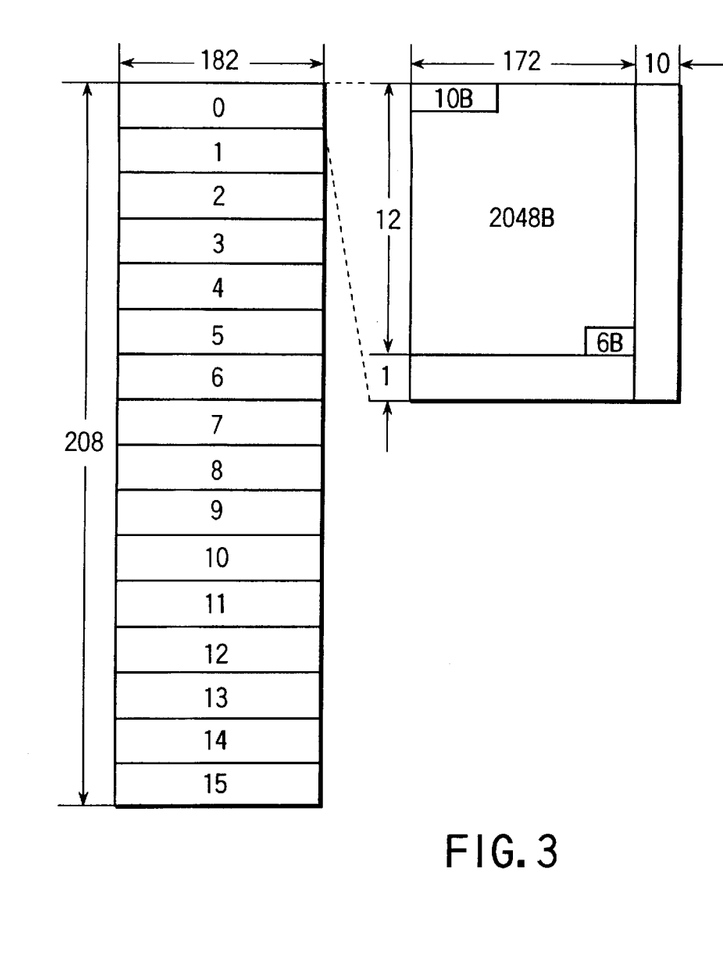
FIG. 3 shows a data format.

Further, 16-row outer code parity data is distributed in between two adjacent sectors. As a result, as shown in FIG. 3, a data format in which 16 sector blocks, each having 182 columns×13 rows, are stacked is produced. The data is taken out row by row from the data format in FIG. 3, and sync patterns are added and a modulation process is performed. Thus, a data sequence to be recorded on the medium is produced.

Figure 4:
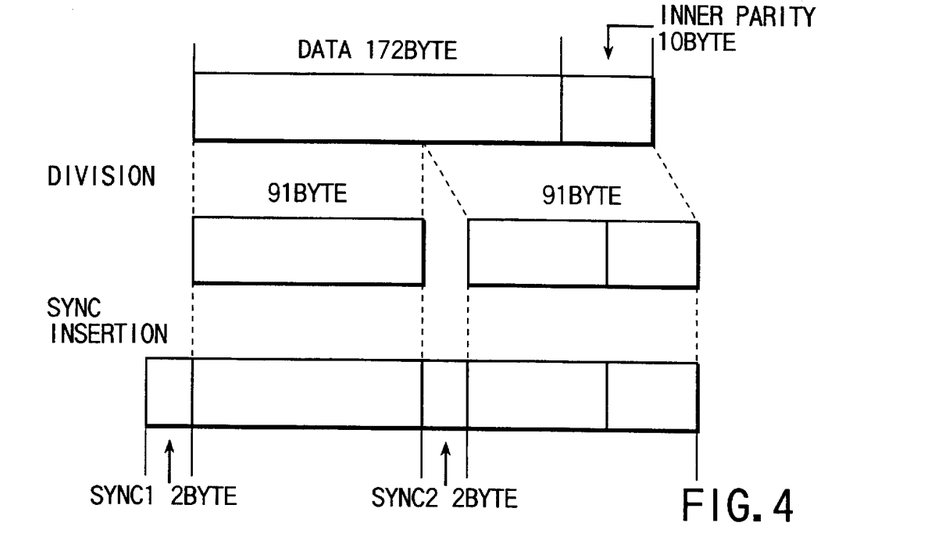
FIG. 4 illustrates a method of constituting a sync block at the time of normal recording.

FIG. 4 shows an example of the method of adding sync patterns, which is currently adopted in DVDs, etc. One-row 182-byte data (called a unit block) including inner code parity is divided into two 91-byte blocks. A two-byte sync pattern is added to the top of each of the divided blocks, and sync blocks are generated. In this case, if different sync patterns are added to the two sync blocks, it is possible to distinguish whether a sync block is a former one or a latter one in the row.

The above data format with a higher recording density will now be described.

If the recording density increases, the level of a playback output signal from the optical pickup unit 9 decreases. When the playback signal level decreases, many random errors are generated. In the case of an optical disk with a higher recording density, it is thus necessary to increase the random error correction capability of error correction codes. In order to enhance the random error correction capability, it is effective to increase the error correction capability of inner codes.

In general, in the case of Reed-Solomon codes, if the size of data to be encoded is the same, the error correction capability is higher as the amount of parity data increases. The error correction capability of RS (n, n−2t, 2t+1) Reed-Solomon codes can generally be found by the following method, wherein Ps denotes a pre-correction symbol error rate and nCk a number of combinations when a number from n to k is selected:

zero error occurrence rate: $P0 = (1-Ps)^n \cdot Ps^0$ one error occurrence rate: $P1 = nC1 \cdot (1-Ps)^{n-1} \cdot Ps^1$ two error occurrence rate: $P2 = nC2 \cdot (1-Ps)^{n-2} \cdot Ps^2$ $k$ error occurrence rate: $Pk = nCk \cdot (1-Ps)^{n-k} \cdot Ps^n$ Since the RS (n, n−2t, 2t+1) Reed-Solomon codes permits correction of t-number of errors at maximum, the post-correction symbol error rate Pe can be expressed by $$Pe := \sum_{m=t+1}^{n} ((m/n) \cdot nCm \cdot (1-Ps)^{n-m} \cdot Ps^m)$$

$$\approx ((t+1)/n) \cdot nCt+1 \cdot (1-Ps)^{n-t-1} \cdot Ps^{t+1}$$

In the case of inner code correction of error correction codes, 5-symbol errors at maximum can be corrected by 10-symbol parity. When the pre-correction symbol error rate is $10^{-9}$, if S is substituted for variable t5 and 182 is substituted for variable n, the symbol error rate Pen after inner code correction can be given by $Pen: 1.28 \times 10^{-9}$ On the other hand, when the high-density recording is performed, a decrease in signal quality is expectable. It is thus necessary to enhance the random error correction capability. If the amount of inner code parity is simply increased for this purpose, the ratio of effective data to record data (formatting efficiency) decreases and the record capacity decreases. For example, if the inner parity data in the error correction code shown in FIG. 2 is increased by two bytes, one-row data block of the error correction code corresponding to one inner code comprises 184 bytes in which 12-byte inner code parity is added to 172-byte data. If the 184-byte block is divided into two, as in the case of normal recording, and the two-byte sync pattern is added to the top of each division, the sync block length increases by one byte. As a result, the ratio of effective data to one sync block varies from 86/93 to 86/94. Accordingly, the formatting efficiency decreases by about 1%.

Under the circumstances, when the high-density recording is performed, part of the region assigned to the sync pattern at the time of normal recording is assigned to the inner code parity and thus the random error correction capability is enhanced while the formatting efficiency is maintained.

Figure 5A:
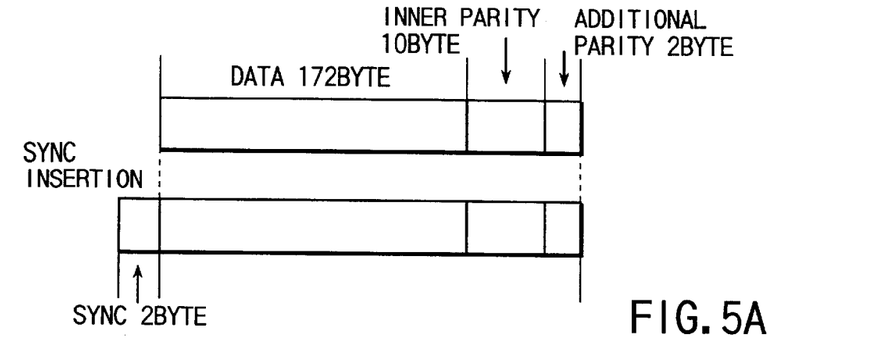
FIGS. 5A and 5B illustrate a method of constituting a sync block at the time of high-density recording.

FIG. 5A illustrates a method of constituting a sync pattern when high-density recording is performed. In the case of high-density recording, the number of inner code parity bits is increased to 12 bytes which is greater by 2 bytes than the number for normal recording, thereby to increase the random error correction capability. This parity is combined with 172-byte data to form a unit block of 184 bytes. Moreover, the number of sync patterns, which in the normal recording are added to two divisions of the unit block of one row, is reduced to one, and a 2-byte sync pattern is added only to the top of the 184-byte row block. Thus, one sync block is constituted. In other words, the number of bytes corresponding to the reduced sync pattern are added to the inner code parity. At this time, the formatting efficiency becomes the same in both cases. In addition, in the case of the high-density recording, the inner code parity number is greater by 2 bytes than that for normal recording and accordingly the error correction capability for random errors increases.

As described above, the normal recording and high-density recording are identical in the data length (172 bytes) of the data area in the unit block. However, in the high-density recording, a sync pattern of 2 bytes is provided on the head of the data area of 172 bytes and an inner code parity of 12 bytes is added to the end thereof. In contrast, in the normal recording, an inner parity of 10 bytes is added to the end of the data area. The data area including an inner code parity of 182 bytes is divided into two divided sections each having 91 bytes. A sync pattern of 2 bytes is added to the head of each of the divided section. More specifically, the normal recording and high-density recording are different in a sync block structure from each other but identical in the length of the sync block.

In the error correction using inner codes at the time of high-density recording, six-symbol errors at maximum can be corrected by 12-symbol parity. The symbol error rate Pen after inner code correction, in a case where the symbol error rate Ps before error correction is 10-1, is obtained as follows by substituting 6 for variable t and 184 for variable n:

$Peh=4.02 \times 10^{-11}$

Specifically, the inner code error correction capability can be improved about 32 times, without lowering the formatting efficiency. This improvement contributes more to the outer code correction. Thus, the total error correction capability, including outer code correction capability, is more improved.

If attention is paid to the interval of sync patterns appearing in the record data sequence, the interval of sync patterns in FIG. 5A is exactly double the interval in FIG. 4. Thus, if an apparatus capable of commonly processing signals for both normal recording and high-density recording is constructed, the mechanism for detecting the interval of sync patterns in the sync detector 12 in the playback system in FIG. 1 can be simplified advantageously. The sync detector 12 estimates, on the basis of the detection result of a sync pattern, the position of the next sync pattern. With use of information as to whether the sync pattern is detected near the estimated position, a process for enhancing the reliability of the sync detector is often performed. In this case, if the counter used in finding the next detection position is constructed such that its count values are differentiated by an integer number of times between the normal recording and the high-density recording, the structure of the sync detector 12 can be greatly simplified.

Figure 5B:
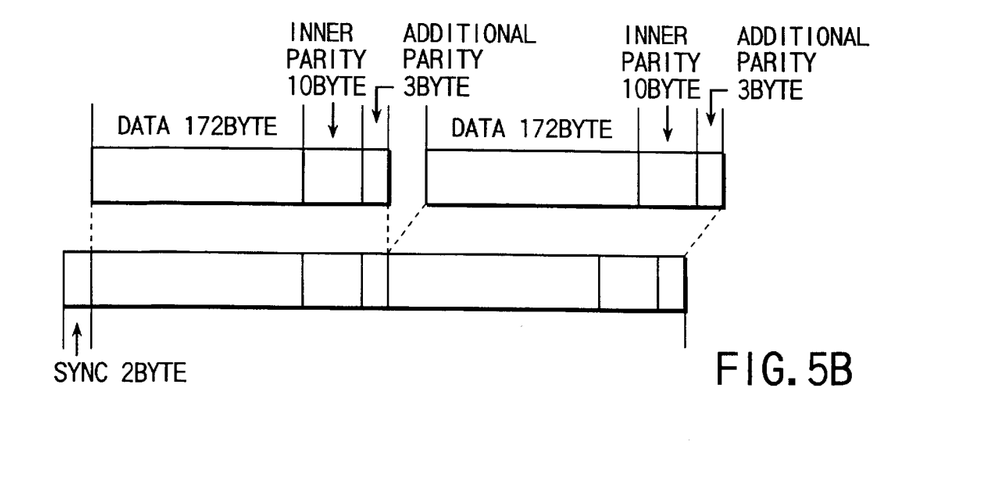

Moreover, if the sync pattern interval is increased four times the interval for the normal recording, the sync block can be generated by the method shown in FIG. 5B. Specifically, the inner code parity number increases by 3 bytes, compared to that for normal recording, and a 2-byte sync pattern is added to 370-byte data for two rows. In this case, too, the formatting efficiency does not vary, compared to the case of normal recording. The error correction capability further increases, compared to the case shown in FIG. 5A.

Figure 6:
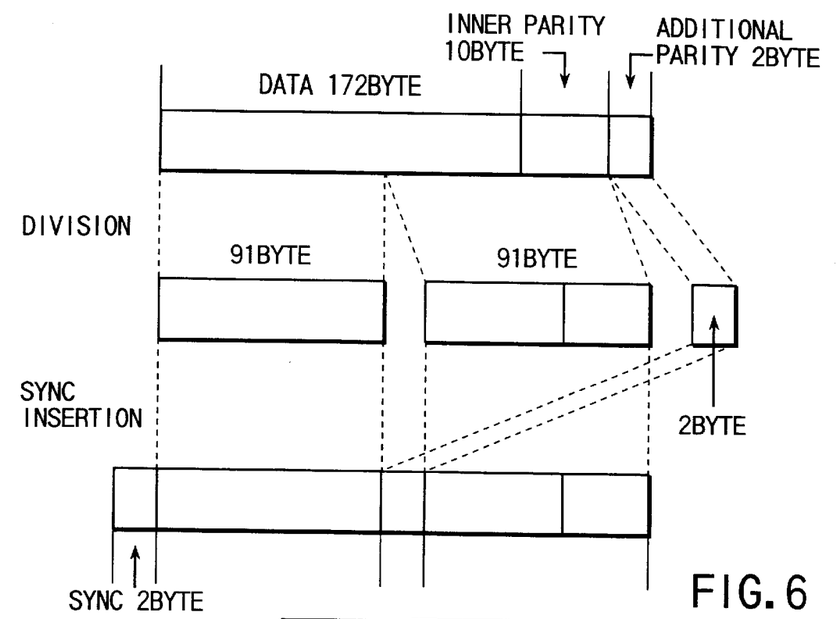
FIG. 6 illustrates another method of constituting a sync block at the time of high-density recording.

FIG. 6 shows an example of generation of another sync block which is suitable for processing in both normal recording and high-density recording.

Like the example in FIG. 5A, suppose that one row of error correction codes is formed of a 184-byte unit block having 172-byte data and 12-byte inner code parity. This unit block is divided into three blocks from its top, which comprise 91 bytes (data), 91 bytes (data and inner code parity) and 2 bytes (additional inner code parity), respectively. The last 2-byte block is inserted between the two 91-byte blocks, thereby generating a new 184-byte block. A 2-byte sync pattern is added to this new block.

Comparing the generated sync block for high-density recording with the sync block for normal recording, the 2-byte inner code parity, which corresponds to a difference between the inner code parity for high-density recording and the inner code parity for normal recording, is located at a position of the second sync pattern for the normal recording.

The compatibility between playback signal processing for normal record data and that for high-density record data in FIG. 6 will now be described.

Referring to FIG. 6, as described above, the normal recording and high-density recording are identical in the data length (172 bytes) of the data area in the unit block. However, in the high-density recording, a sync pattern of 2 bytes is provided on the head of the data area of 172 bytes and an inner code parity of 12 bytes is added to the end thereof. In contrast, in the normal recording, an inner parity of 10 bytes is added to the end of the data area. The data area including an inner code parity of 182 bytes is divided into two divided sections each having 91 bytes. A sync pattern of 2 bytes is added to the head of each of the divided section. More specifically, the normal recording and high-density recording are different in a sync block structure from each other but identical in the length of the sync block.

A difference in both signal processing of the normal recording block and the high-density recording block may possibly occur with respect to the sync block processing and inner code correction processing. These processes correspond to the process in the sync detector 12, playback memory address controller 16 and error correction decoder 15 in FIG. 1. In the record signal process, too, the corresponding sync insertion section 7, record memory address control section 4 and error correction encoder 3 are related. However, a description will now be given of only the playback signal process which is important for the compatibility between both data formats.

In a situation where normal record media and high-density record media are mixed in use, it is necessary to exactly identify the record format of the medium and perform a signal process suitable for the format. It is also important to easily switch both signal processes. Furthermore, it is desirable to take measures to erroneous detection of the format. Paying attention to the operation of the playback memory address controller, the ease of the compatibility process will now be described.

Figure 7A:
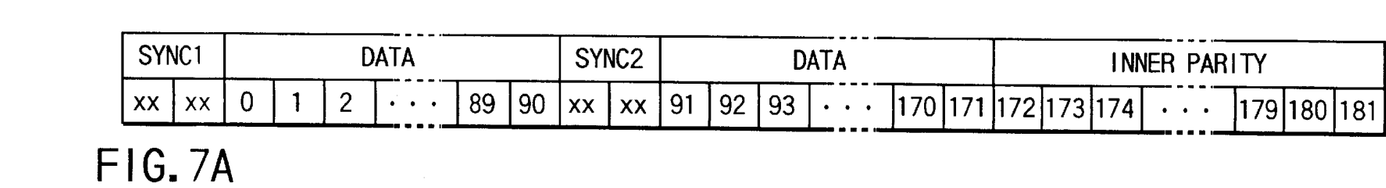
FIGS. 7A to 7D illustrate a method of generating addresses for a reproduction signal process.

FIG. 7A shows an example of correspondency between playback data, which has been played back by subjecting normal record data to a normal record signal process, and addresses for the playback memory. The write address for the memory is reset at "0" at the top of the data following a top sync pattern position in an ascending order. Then, synchronized with the playback data, the addresses are updated in the ascending order. If an intermediate sync pattern is detected, the write address is preset at "91" corresponding to the top of the second block. If the intermediate sync pattern is not detected, write is prohibited during a time period corresponding to the sync pattern and at the same time the updating of the address is suspended. As regards the data of the second block, the addresses are generated in the ascending order. In this manner, the data written in the memory is read out in accordance with the read-out addresses generated from "0" in the ascending order and a data sequence to be supplied to the error correction decoder is generated.

Figure 7B:
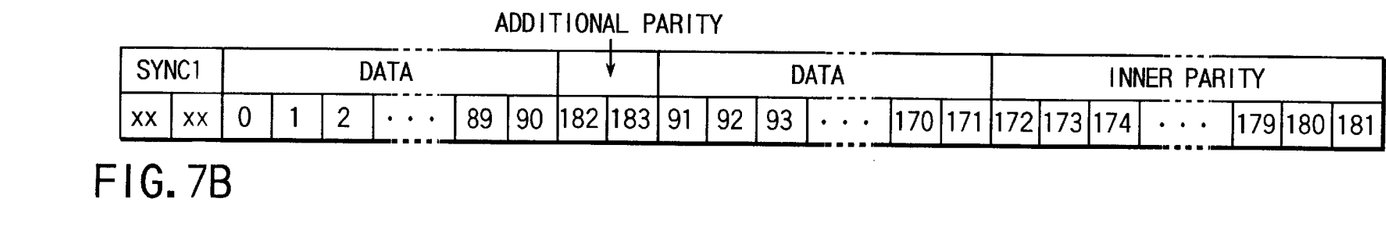

FIG. 7B shows an example in which high-density record data has been subjected to the high-density record signal process. The write address counter is reset at "0", with the sync pattern position at the top of the block being used as a reference position. Then, synchronized with the playback data, write addresses are generated in the ascending order. The address counter is not updated for the 2-byte inner code parity added for the high-density recording, and addresses "182" and "183" are output instead. Then, addresses beginning with "91" are generated in the ascending order. If the data written in the memory is read out in accordance with the read-out addresses generated from "0" in the ascending order, a data sequence to be supplied to the error correction decoder is obtained.

Figure 7C:
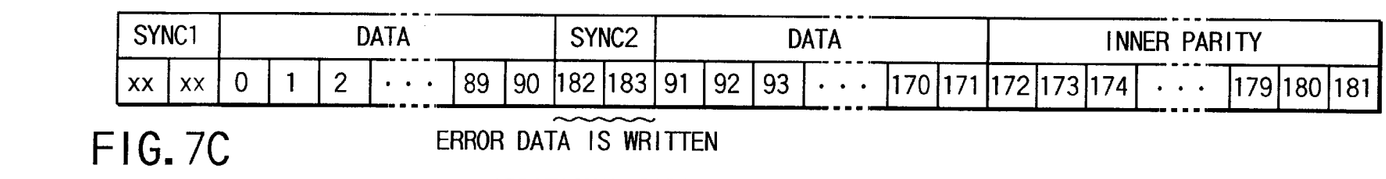

FIG. 7C shows an example in which normal record data has been subjected to the high-density record signal process. If normal record-format data is written/read out in/from the memory according to a high-density record algorithm, the data corresponding to the intermediate sync pattern is written at addresses "182" and "183". Two-byte inner code parity data added for high-density recording should normally be written at these addresses. The other data and remaining 10-byte inner code parity data is correctly located as error correction codes. If this data sequence is processed in the error correction decoder, the 2-byte data corresponding to the sync pattern is recognized as an error. However, if the error in the other part is four bytes or less, the error correction can be exactly performed. In other words, even if the normal record data is erroneously processed as high-density record data, the error correction capability merely lowers and, if the playback signal quality is sufficiently maintained, the signal process can be continued.

Figure 7D:
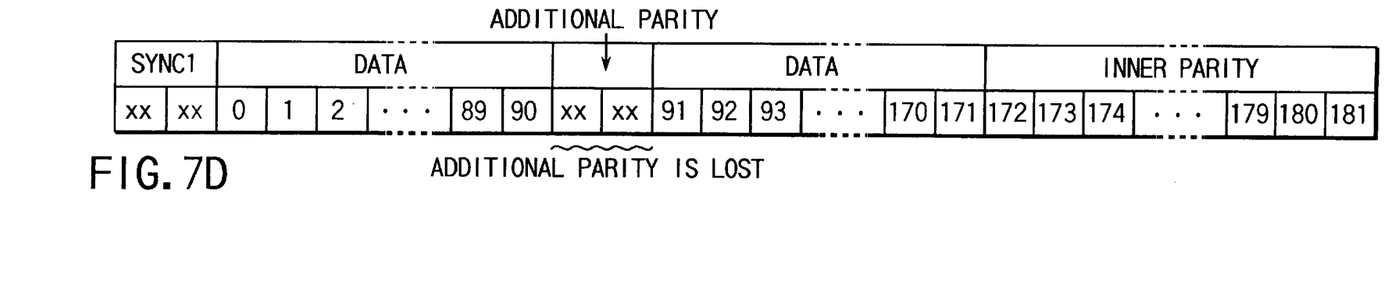

FIG. 7D shows an example in which high-density record data has been subjected to the normal record signal process. If high-density record-format data is written/read out in/from the memory according to a normal record algorithm, 2-byte inner code parity data, which should be written at addresses "182" and "183", is not correctly written in the memory and is lost. In this case, the 172-byte data and 10-byte inner code parity data read out from the memory is exactly the same as the inner code data sequence of the normal record mode, and if this data sequence is processed by the error correction decoder, the error correction capability becomes equal to that for the normal recording. However, the error correction process can be exactly performed. In other words, even if the high-density record data is processed as normal record data, the error correction capability merely becomes equal to that for the normal recording, and the signal processing can be continued.

Even if the write address generation method is always set to match with high-density record data, no problem will arise if the read-out address generation method matches with the data format of the data to be processed. In a case where a gate signal indicating whether input signal is valid or invalid can be input to the error correction decoder, the read-out address generation method can always be set to match with the high-density record data by inputting a proper gate signal in accordance with the data format.

In the explanation of the above embodiments, it is assumed that the inner code parity for the normal recording is identical to that for the high-density recording except for the additional parity. However, the inner code parity may not be identical between the normal recording and the high-density recording due to the structure of the error correction code. In this case, even if the format cannot be correctly recognized, the data except for the parity can be correctly written in the memory. Accordingly, the data is recognized as correct data in the outer code parity, so that the data can be relieved.

Also, the high-density recording inner parity is identical to the normal recording inner parity and the additional parity area is usable as an area for recording third parity following the inner code and the outer code. In this case, the inner code correction processing and outer code correction processing have no change. Accordingly, the error correction processing using the third parity may be performed only in the high-density recording. As a result, it is became easy to attain a playback compatibility between the formats different from each other in the recording density.

As has been described above, according to the present invention, when recording density is high, the size of a block to which a sync pattern is added is made greater than in the case of low recording density. Thus, the number of sync patterns per unit data is reduced and additional parity check data is assigned to a region corresponding to the omitted sync pattern. Thereby, even if the inner code parity number is increased to enhance the random error correction capability at the time of high density recording, the formatting efficiency is not lowered. Furthermore, when signal processing matching with both data formats is performed, the degree of common signal processing can be easily increased or the processing can be easily switched.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data generation method for generating a data stream comprising the steps of:
    a first data generation process for recording data on a recording medium with a first recording density including,
        encoding input digital data in accordance with a first error correction coding to generate a first check parity,
        making a first unit block having a data area having a predetermined data length and the first check parity provided at an end of the data area,
        dividing first the unit block into a plurality of divided areas, and
        providing a sync pattern at a head of each of the first divided areas to obtain a first data stream, and
    a second data generation process for recording data on a recording medium with a second recording density higher than the first recording density including,
        encoding input digital data in accordance with a second error correction coding to generate a second check parity greater in number than the first check parity,
        making a second unit block having a data area having a predetermined data length and the second check parity provided at an end of the data area, and
        providing a sync pattern at a head of second unit block to obtain a second data stream, and
    wherein at least one of the first data generation process and the second data generation process is used to generate the data stream.

2. The data generation method according to claim 1, wherein a step of encoding input data in accordance with a first correction coding includes encoding an inner code to generate an inner code parity as the first check parity.

3. The data generation method according to claim 1, wherein a step of encoding input data in accordance with a second error correction coding includes encoding an inner code to generate an inner code parity having the number of bytes corresponding to a sum of the number of bytes of the first check parity and the number of bytes of a sync pattern provided between the first divided areas in the first data process as a second check parity by encoding an inner code.

4. A data generation method for generating a data stream comprising the steps of:
    a first data generation process for recording data on a recording medium with a first recording density including,
        encoding input digital data in accordance with a first error correction coding to generate a first check parity,
        making a first unit block having a data area having a predetermined data length and the first check parity provided at an end of the data area,
        dividing the first unit block into a plurality of divided areas, and
        providing a sync pattern at a head of each of the first divided areas, to obtain a first data stream, and
    a second data generation process for recording data on a recording medium with a second recording density higher than the first recording density including,
        encoding input digital data in accordance with a second error correction coding to generate a second check parity greater in number than the first check parity,
        making a second unit block having a data area having a predetermined data length and a part of the second check parity provided at an end of the data area,
        dividing the second unit block into a plurality of second divided areas,
        providing a sync pattern at a head of a top one of the second divided areas, and
        providing a remaining part of the second check parity at a head of another one of the second divided areas which follows the top one, to obtain a second data stream, and
    wherein at least one of the first data generation process and the second data generation process is used to generate the data stream.

5. The data generation method according to claim 4, wherein a step of encoding input data in accordance with a first correction coding includes encoding an inner code to generate an inner code parity as the first check parity.

6. The data generation method according to claim 4, wherein a step of encoding input data in accordance with a second error correction coding includes encoding an inner code to generate an inner code parity inner code parity having the number of bytes corresponding to a sum of the number of bytes of the first check parity and the number of bytes of a sync pattern provided between the first divided areas in the first data process as a second check parity by encoding an inner code.

7. A data generation apparatus for generating a data stream comprising:
    a first data generation unit which records data on a recording medium with a first recording density including,
        a first encoder which encodes input digital data in accordance with a first error correction coding to generate a first check parity,
        a first unit block making section which makes a first unit block having a data area having a predetermined data length and the first check parity provided at an end of the data area,
        a first dividing section which divides the first unit block into a plurality of divided areas, and
        a first providing section which provides a sync pattern at a head of each of the first divided areas to obtain a first data stream, and
    a second data generation unit which records data on a recording medium with a second recording density higher than the first recording density including,
        a second encoder which encodes input digital data in accordance with a second error correction coding to generate a second check parity greater in number than the first check parity,
        a second unit block making section which makes a second unit block having a data area having a predetermined data length and the second check parity provided at an end of the data area, and a second providing section which provides a sync pattern at a head of the second unit block to obtain a second data stream, and wherein at least one of the first data generation unit and the second data generation unit is used to generate the data stream.

8. The data generation apparatus according to claim 7, wherein the first encoder includes an encoder which encodes an inner code to generate an inner code parity as the first check parity.

9. The data generation apparatus according to claim 7, wherein the second encoder includes an encoder which encodes an inner code to generate an inner code parity having the number of bytes corresponding to a sum of the number of bytes of the first check parity and the number of bytes of a sync pattern provided between the first divided areas in the first data process as a second check parity by encoding an inner code.

10. A data generation apparatus for generating a data stream comprising:

a first data generation unit which records data on a recording medium with a first recording density including, a first encoder which encodes input digital data in accordance with a first error correction coding to generate a first check parity, a first unit block making section which makes a first unit block having a data area having a predetermined data length and the first check parity provided at an end of the data area, a first dividing section which divides the first unit block into a plurality of divided areas, and a first providing section which provides a sync pattern at a head of each of the first divided areas, to obtain a first data stream, and a second data generation unit which records data on a recording medium with a second recording density higher than the first recording density including, a second encoder which encodes input digital data in accordance with a second error correction coding to generate a second check parity greater in number than the first check parity, a second unit block making section which makes a second unit block having a data area having a predetermined data length and a part of the second check parity provided at an end of the data area, a second dividing section which divides the second unit block into a plurality of second divided areas, a second providing section which provides a sync pattern at a head of a top one of the second divided areas, and a third providing section which provides a remaining part of the second check parity at a head of another one of the second divided areas which follows the top one, to obtain a second data stream, and wherein at least one of the first data generation unit and the second data generation unit is used to generate the data stream.

11. The data generation apparatus according to claim 10, wherein the first encoder includes an encoder which encodes an inner code to generate an inner code parity as the first check parity.

12. The data generation method according to claim 10, wherein the second encoder includes an encoder which encodes an inner code to generate an inner code parity having the number of bytes corresponding to a sum of the number of bytes of the first check parity and the number of bytes of a sync pattern provided between the first divided areas in the first data process as a second check parity by encoding an inner code.

* * * * *